United States Patent
Anglin et al.

(10) Patent No.: US 7,865,365 B2
(45) Date of Patent: Jan. 4, 2011

(54) PERSONALIZED VOICE PLAYBACK FOR SCREEN READER

(75) Inventors: Debbie Ann Anglin, Austin, TX (US);
Howard Neil Anglin, Austin, TX (US);
Nyralin Novella Kline, Round Rock, TX (US)

(73) Assignee: Nuance Communications, Inc., Burlington, MA (US)

(*) Notice: Subject to any disclaimer, the term of this patent is extended or adjusted under 35 U.S.C. 154(b) by 1465 days.

(21) Appl. No.: 10/912,496

(22) Filed: Aug. 5, 2004

(65) Prior Publication Data

US 2006/0031073 A1   Feb. 9, 2006

(51) Int. Cl.
G10L 13/00 (2006.01)
G10L 15/00 (2006.01)
G10L 15/18 (2006.01)
G10L 13/06 (2006.01)

(52) U.S. Cl. .................. 704/258; 704/257; 704/266; 704/268

(58) Field of Classification Search .................. 704/270
See application file for complete search history.

(56) References Cited

U.S. PATENT DOCUMENTS

| | | | |
|---|---|---|---|
| 5,278,943 A | 1/1994 | Gasper et al. .................. 395/2 |
| 5,559,927 A * | 9/1996 | Clynes .................. 704/258 |
| 5,812,126 A | 9/1998 | Richardson et al. |
| 5,860,064 A * | 1/1999 | Henton .................. 704/260 |
| 5,995,590 A | 11/1999 | Brunet et al. |
| 6,023,678 A | 2/2000 | Lewis et al. .................. 704/260 |
| 6,035,273 A | 3/2000 | Spies |
| 6,570,983 B1 | 5/2003 | Speeney et al. ......... 379/373.02 |
| 6,611,802 B2 | 8/2003 | Lewis et al. .................. 704/235 |
| 6,856,958 B2 * | 2/2005 | Kochanski et al. .......... 704/260 |
| 6,862,568 B2 * | 3/2005 | Case .......................... 704/260 |
| 6,865,533 B2 * | 3/2005 | Addison et al. ............. 704/260 |
| 7,277,855 B1 * | 10/2007 | Acker et al. ................. 704/260 |

(Continued)

FOREIGN PATENT DOCUMENTS

EP   0930767 A2   7/1999

(Continued)

OTHER PUBLICATIONS

"Method for Text Annotation Play Utilizing a Multiplicity of Voices," TDB, v. 36, No. 6B, pp. 9-10, (1993).

(Continued)

*Primary Examiner*—Brian L Albertalli
(74) *Attorney, Agent, or Firm*—Wolf, Greenfield & Sacks, P.C.

(57) ABSTRACT

A method, system, and computer program product is disclosed for customizing a synthesized voice based upon audible input voice data. The input voice data is typically in the form of one or more predetermined paragraphs being read into a voice recorder. The input voice data is then analyzed for adjustable voice characteristics to determine basic voice qualities (e.g., pitch, breathiness, tone, speed; variability of any of these qualities, etc.) and to identify any "specialized speech patterns". Based upon this analysis, the characteristics of the voice utilized to read text appearing on the screen are modified to resemble the input voice data. This allows a user of the system to easily and automatically create a voice that is familiar to the user.

15 Claims, 2 Drawing Sheets

U.S. PATENT DOCUMENTS

| | | | |
|---|---|---|---|
| 7,280,968 B2 * | 10/2007 | Blass | 704/266 |
| 7,483,832 B2 * | 1/2009 | Tischer | 704/260 |
| 2003/0028380 A1 | 2/2003 | Freeland et al. | 704/260 |
| 2003/0120492 A1 | 6/2003 | Kim et al. | 704/270 |
| 2003/0219104 A1 | 11/2003 | Malik | |
| 2004/0054534 A1 | 3/2004 | Junqua | 704/258 |
| 2004/0088167 A1 | 5/2004 | Santini | |
| 2005/0027539 A1 | 2/2005 | Weber et al. | |
| 2005/0071163 A1 * | 3/2005 | Aaron et al. | 704/260 |
| 2005/0074132 A1 * | 4/2005 | Lemoine et al. | 381/101 |
| 2006/0031073 A1 * | 2/2006 | Anglin et al. | 704/270 |
| 2006/0069567 A1 * | 3/2006 | Tischer et al. | 704/260 |
| 2007/0260461 A1 * | 11/2007 | Marple et al. | 704/260 |

FOREIGN PATENT DOCUMENTS

WO    WO 02084643 A1 * 10/2002

OTHER PUBLICATIONS

Lemmetty, S., Helsinki University of Technology, Dept. of Elecrical and Communications Engineering, "Review of Speech Synthesis Technology," downloaded on Jul. 14, 2005 from: http://www.acoustics.hut.fi/~slemmett/dippa/index.html.

Tyson, Jeff, How Stuff Works,"How Instant Messaging Works," downloaded from http://computer.howstufworks.com/instant-messaging.hjtml/printablle on Jul. 14, 2005.

WHATIS.COM, "Sable" downloaded from http://whatis-techtarget.com/definition/0,sid9_gci833759.00html on Jul. 14, 2005.

WHATIS.COM. "Speech Synthesis" downloaded from http://whatis-techtarget.com/defnition/0,sid9_gci773595.00html on Jul. 14, 2005.

SEARCH MOBILE COMPUTING.COM "Text-to-speech", downloaded from http://searchmobilecomputing.techtarget.com/sdefinition/0,29060,sid4 . . . on Jul. 14, 2005.

East Bay Technologies, "IM Speak! Version 3.8" downloaded on Jul. 13, 2005 from http://www.eastbaytech.com, 1 page.

Singer, Michael, "Teach your Toys to Speak IM", downloaded on Jul. 13, 2005 from http://www.instantmessagingplanet.com, 2 pages.

Office Action mailed Aug. 21, 2009 in Chinese Patent Application No. 200610093550.

* cited by examiner

PERSONALIZED VOICE PLAYBACK FOR SCREEN READER

BACKGROUND OF THE INVENTION

1. Field of the Invention

This invention relates generally to the field of screen reading systems and, in particular, to a method and system for personalizing audio playback of screen reading systems.

2. Description of the Related Art

Numerous computer applications have been developed which provide for audio playback of text being displayed on a monitor connected with the computer system. In many instances, such system are developed for use by visually impaired users of the computer; however, it is not uncommon for such screen reading systems to be employed in software programs of all kinds.

ViaVoice by IBM is an example of a program that utilizes a screen reader system. ViaVoice is a voice dictation program by which a user may input dictation into a microphone, and the dictation is converted to a textual representation of the dictation for insertion into a program, such as a word processor, email program, etc. Among the features of ViaVoice is screen reading capability, whereby a user can opt to have a synthesized voice read selected portions of text appearing on the screen. If desired, the reading back of the text can be accompanied by a visual representation (animated) so that, for example, a child using the system can see an animated character speaking the words being read by the system.

Many people find that the computer-generated voices that come installed with screen readers of this type are mundane, and many have difficulty understanding them. The sound of most of these voices tends to be monotone in nature and quite mechanical, with little variance in tone, pitch, or speed. Typically, voices are provided in both male and female pitches, and a user may have the ability to select a higher pitch, a lower pitch, or even a different language.

Many of these programs provide the ability to customize the voice, e.g., they allow the user access to controls to vary the pitch, tone, and/or speed of the voice. These adjustable parameters, while changing the sound, do not result in a realistic-sounding voice or voice pattern. An example of a customizable voice system can be found in U.S. Published patent application No. 2004/0054534, filed on Sep. 13, 2002.

It would be desirable to have a customizable screen-reading system whereby the voice used to read back text is automatically customized to emulate the speech patterns of the user or a voice familiar to the user.

SUMMARY OF THE INVENTION

A method and system for customizing a synthesized voice based upon audible input voice data is disclosed. The input voice data is typically in the form of one or more predetermined paragraphs being read into a voice recorder. The input voice data is then analyzed for adjustable voice characteristics to determine basic voice qualities (e.g., pitch, breathiness, tone, speed; variability of any of these qualities, etc.) and to identify any "specialized speech patterns". Based upon this analysis, the characteristics of the voice utilized to read text appearing on the screen are modified to resemble the input voice data. This allows a user of the system to easily and automatically create a voice that is familiar to the user.

DETAILED DESCRIPTION OF THE PREFERRED EMBODIMENT

Figure 1:
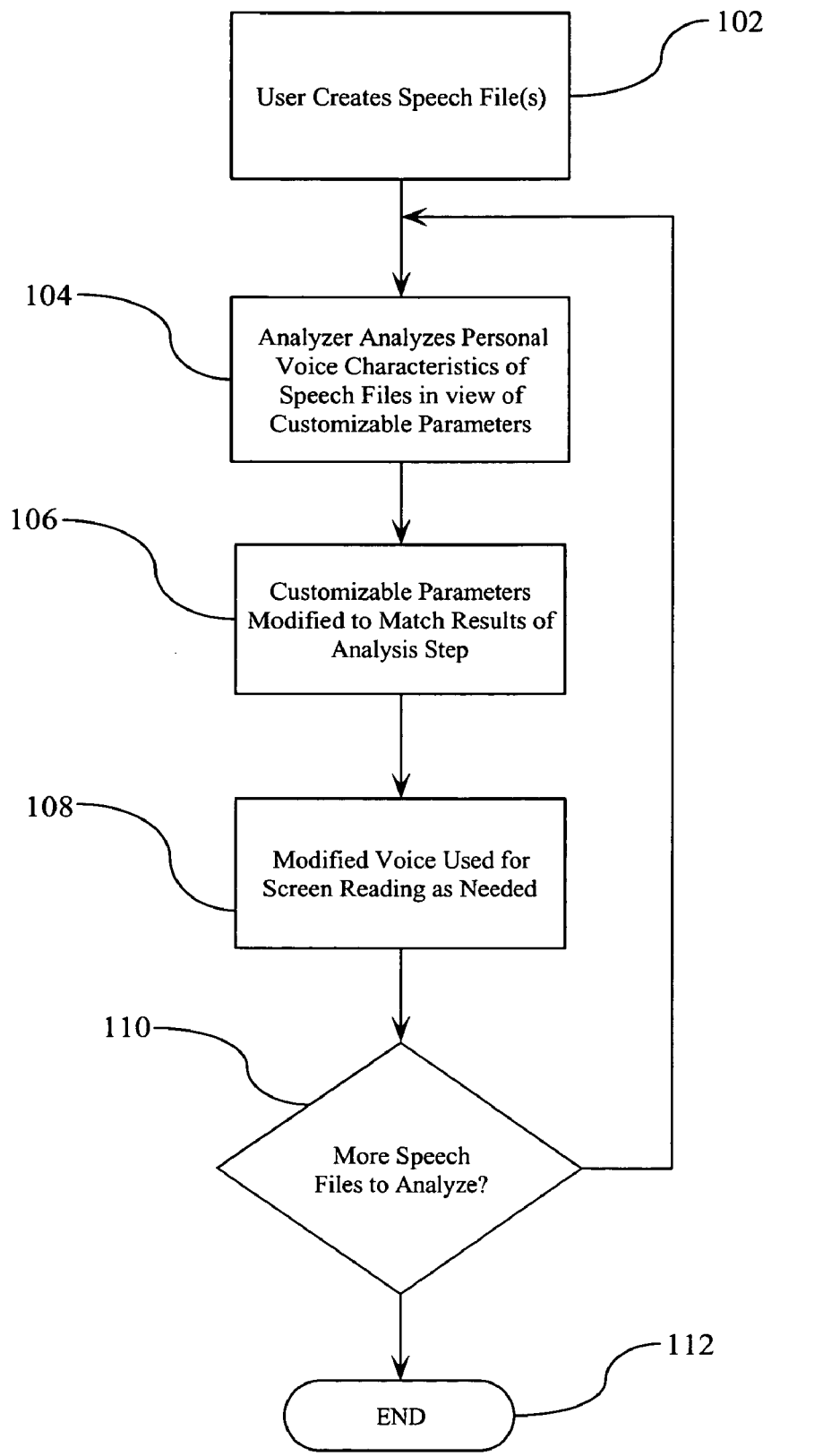
FIG. 1 is a flowchart illustrating an example of the steps performed in accordance with the present invention to set up a system for reading text in a customized voice.

FIG. 1 is a flowchart illustrating an example of the steps performed in accordance with the present invention to set up a system for reading text in a customized voice. Throughout this application, the term "reading" is used to describe the text-to-speech capability of a computer or other system capable of converting input text to an audible form and outputting the audible form via speakers, headphones, etc. The concept described in connection with FIG. 1 includes the creation and storage of speech samples in a speech file; the analysis of the speech samples to identify personal voice characteristics of a person creating the speech sample; the identification of certain of the personal voice characteristics as representing any specialized speech patterns; and the creation of an output voice file which is adjustable to match the personal voice characteristics. Each of these steps is discussed in further detail below.

At step 102, a user of the system of the present invention creates and stores audible input voice data in the form of one or more speech samples in a speech file. The purpose of creating and storing the speech file is to develop a sample of a minimum size to use for analyzing the personal voice characteristics of the person whose voice will be emulated by the system. It is contemplated that the speech samples will be, in a preferred embodiment, predefined text of a predetermined length. In a preferred embodiment, the text is selected so that an average reader will encounter text and punctuation that will enable the system to identify specialized speech patterns, that is, personal voice characteristics that can be correlated to a series of known speech patterns. For example, one specialized speech pattern could be "excited speech" whereby an average reader would read a section of text in an excited manner. This can be triggered by the context of the reading as well as through the use of punctuation, for example, exclamation points. Numerous other speech patterns (e.g., soft speech, loud speech, sad speech, angry speech, expressive speech, etc.) can be elicited using text samples that will cause an average reader to read the text in the appropriate manner. The exact language of the text samples used to elicit speech patterns is a matter of personal design choice and thus specific examples of such text will not be provided herein.

At step 104, a speech analyzer analyzes the personal voice characteristics of the speech file in view of the customizable parameters and the various speech patterns with which the portions of the speech file correspond. The system is configured to extract the speech parameters of the speech file and store a record, in the form of a speech profile, identifying the various adjustable parameters associated with the speech pattern elements of the speech files. For example, when User A reads a portion of the predefined text that is correlated to excited speech, the speed of the actual speech, as well as the pitch of the actual speech, may rise to a higher level than would be used for "normal" or non-excited speech. Pitch variations from one word to the next may also occur. Other parameters may also have specific values associated with excited speech (e.g., volume). Each of these parameters are identified and stored in the speech profile and are associated with excited speech. The same process is followed for each of the various speech patterns that will be elicited by the predefined speech text, and the synthesized speech output by the system will be adjusted to match the characteristics of the actual speech. It is not the specific parameters used that defines the present invention; rather, it is the analysis of the input speech, based on one or more adjustable parameters, and the adjustment of synthesized speech to match those parameters that is at the heart of the present invention.

At step 106, the parameters of the output voice file are adjusted to reflect the parameters identified during the analysis step. For example, the user will have read a portion of the text designed to elicit "normal" speech patterns and speech levels as part of step 102. These values, stored in the speech profile, will be used as the default output voice file used for speech output by the system. However, when analysis of the text being read by the system indicates the appropriateness of a modification of the speech pattern, e.g., if the text currently being read by the system appears to indicate the existence of angry speech, then the values stored in the speech profile for angry speech will be used to modify the output voice file during the reading of that portion of the output text.

The same process can be utilized to capture and output speech using a particular accent exhibited by the user. For example, the analyzer can be configured to identify certain pronunciation patterns of the user with respect to certain combinations of letters, words, etc. and thus modify the speech output by the synthesizer to emulate the accent.

At step 108, the modified voice is stored as the current speech profile, to be used in connection with text reading as described below. At step 110, a determination is made as to whether or not there are any additional speech files to be analyzed. This allows a constant refining of the speech profile as the user uses the system. For example, the user can read additional predefined materials on a regular basis, thereby increasing the resolution of the produced voice. This step is optional; with a single reading of predefined text at the beginning of the process, the system will function adequately.

If at step 110, it is determined that there are additional speech files to analyze, the process reverts back to step 104 where the analysis process described above is repeated. If, at step 110, it is determined that there are no additional speech files to analyze, the process proceeds to step 112 where it ends.

Figure 2:
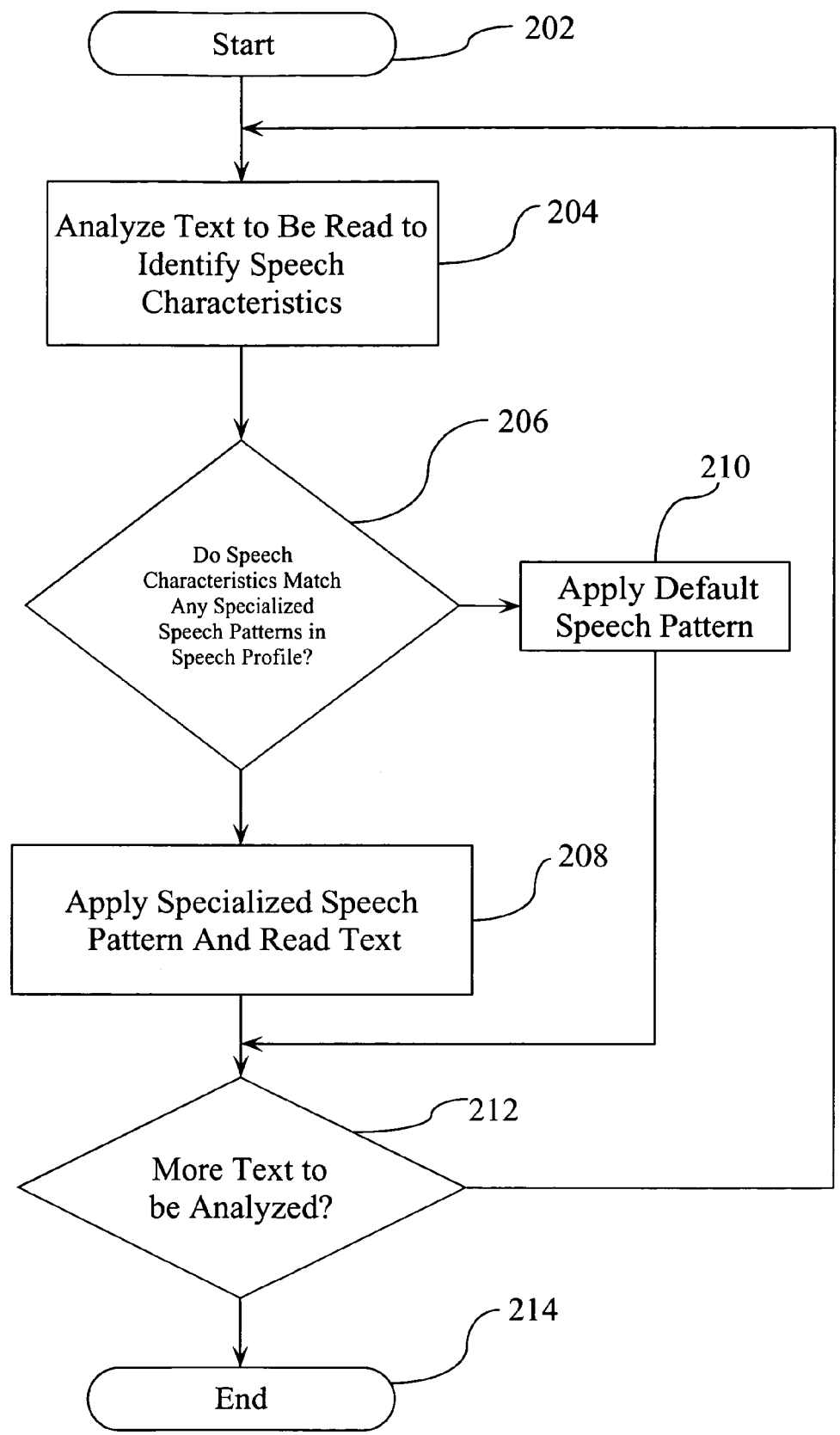
FIG. 2 is a flow chart illustrating the operation of a text reading system configured in accordance with the present invention.

FIG. 2 is a flow chart illustrating the operation of a text reading system configured in accordance with the present invention. At step 202, the process begins and proceeds to step 204. At step 204, a portion of text to be read by the screen reader is analyzed to identify speech characteristics contained therein. Depending upon the processing power available and the degree of resolution desired, this analysis can be performed on a word-by-word basis, sentence-by-sentence basis, paragraph-by-paragraph basis, or any other desired level of resolution. In most cases, analysis on a word-by-word basis will be too restrictive and, in the preferred embodiment, the analysis is performed on a sentence-by-sentence basis. It is also understood that multiple sentences adjacent to each other may be analyzed separately and then analyzed as a group (e.g., if a paragraph contains five sentences, each sentence can be individually analyzed, and then the entire paragraph as a whole can be analyzed to serve as a check mechanism to identify potential aberrations). The analysis is performed using the system processor of the computer system on which the screen reader resides, using software running on the processor. The software configures the processor to perform the analysis described above in a well-known manner.

The object of the analysis in step 204 is to match speech characteristics identified for the analyzed text portion with specialized speech patterns identified in the speech profile. Known systems analyze words in context, e.g., voice dictation software is known that analyzes a word being translated into text based on an analysis of the words around it, to identify with greater accuracy the spelling of the word. This is commonly used to, for example, select one of several alternative spellings of a word (e.g., too; to; two) based on the context in which it is used. In the same manner, the present invention can analyze a single word based on the words around it prior to deciding the particular specialized (or normal) speech pattern to use when reading the word. Triggers such as exclamation points, all-caps, certain words, and the like all can indicate, for example, angry or excited speech. Identification of these triggers (or any other trigger) enable the appropriate voice to be used when reading the text, as described below.

Based on the analysis performed in step 204, at step 206 it is determined whether or not there are characteristics in the analyzed text that correspond to a specialized speech pattern in the speech profile. If there are, then at step 208, the specialized speech pattern is applied to that text and the text is read (or queued for subsequent reading) by the speech reader using that specialized speech pattern. If, at step 206, a determination is made that the characteristics of the text under analysis do not match any of the specialized speech patterns in the speech profile, then the process proceeds to step 210, where the default speech pattern is applied and the text is read using the default speech pattern.

The process then proceeds to step 212, where a determination is made as to whether or not there is additional text to be analyzed. If, at step 212, it is determined that there is additional text to be analyzed, the process proceeds back to step 204 where the process is repeated. If, however, at step 212, it is determined that all of the text has been analyzed, then the process ends at step 214.

Using the present invention, a user is given the option of having available a voice in a speech reader that is familiar to, and, if desired, an emulation of, the user. This leads to a higher comfort level in the use of speech reading systems.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation on which the screen reader resides. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for automatically customizing output synthesis in a text-to-speech system, the method comprising:
   creating one or more speech samples using an input voice of a human, the speech samples resulting from the human uttering a first text;
   analyzing said speech samples to extract a separate set of sound parameter values associated with personal speech characteristics of said input voice for each of first and second speech patterns, wherein the first and second speech patterns represent different manners of speaking in a same language, and wherein the sound parameter values relate to at least one quality selected from the group consisting of pitch, breathiness, tone, speed, volume, pitch variation, breathiness variation, tone variation, speed variation and volume variation;
   determining a separate set of output synthesis parameter values for each of the first and second speech patterns based, at least in part, on the respective separate set of sound parameter values of said input voice;
   storing each separate set of output synthesis parameter values as a separate speech profile element for the human;
   analyzing at least a portion of at least one second text, the at least one second text being unrelated to the first text, to select, from among the separate speech profile elements of the first and second speech patterns, a selected separate speech profile element based on how well the selected separate speech profile element corresponds to the at least a portion of the at least one second text; and
   applying the separate set of output synthesis parameter values of the selected separate speech profile element to synthesize the at least a portion of the at least one second text via the text-to-speech system to speech that includes at least some of the personal speech characteristics of the input voice.

2. The method of claim 1, wherein the creating the one or more speech samples using the input voice includes eliciting a plurality of speech patterns of said input voice, and wherein the analyzing said speech samples includes associating sound parameters with speech patterns of the plurality of speech patterns of said input voice.

3. The method of claim 1, wherein the analyzing the at least a portion of the at least one second text comprises determining that the at least a portion of the at least one second text contains one or more triggers associated with the speech pattern corresponding to the selected separate speech profile element.

4. The method of claim 1, wherein at least one of the first and second speech patterns represents an emotional state.

5. The method of claim 2, wherein the step of eliciting the plurality of speech patterns of said input voice comprises constructing the first text to elicit the plurality of speech patterns when the human utters the first text.

6. A system for automatically customizing output synthesis in a text-to-speech system, the system comprising at least one processor programmed to:
   create one or more speech samples using an input voice of a human, the speech samples resulting from the human uttering a first text;
   analyze said speech samples to extract a separate set of sound parameter values associated with personal speech characteristics of said input voice for each of first and second speech patterns, wherein the first and second speech patterns represent different manners of speaking in a same language, and wherein the sound parameter values relate to at least one quality selected from the group consisting of pitch, breathiness, tone, speed, volume, pitch variation, breathiness variation, tone variation, speed variation and volume variation;
   determine a separate set of output synthesis parameter values for each of the first and second speech patterns based, at least in part, on the respective separate set of sound parameter values of said input voice;
   store each separate set of output synthesis parameter values as a separate speech profile element for the human;
   analyze at least a portion of at least one second text, the at least one second text being unrelated to the first text, to select, from among the separate speech profile elements of the first and second speech patterns, a selected separate speech profile element based on how well the selected separate speech profile element corresponds to the at least a portion of the at least one second text; and
   apply the separate set of output synthesis parameter values of the selected separate speech profile element to synthesize the at least a portion of the at least one second text to speech that includes at least some of the personal speech characteristics of the input voice.

7. The system of claim 6, wherein creating the one or more speech samples using the input voice comprises eliciting a plurality of speech patterns of said input voice, and wherein analyzing said speech samples comprises associating sound parameters with speech patterns of the plurality of speech patterns of said input voice.

8. The system of claim 6, wherein analyzing the at least a portion of the at least one second text comprises determining that the at least a portion of the at least one second text contains one or more triggers associated with the speech pattern corresponding to the selected separate speech profile element.

9. The system of claim 6, wherein at least one of the first and second speech patterns represents an emotional state.

10. The system of claim 7, wherein eliciting the plurality of speech patterns of said input voice comprises constructing the first text to elicit the plurality of speech patterns when the human utters the first text.

11. A computer program product for automatically customizing output synthesis in a text-to-speech system, the computer program product comprising a computer-readable storage medium having computer-readable program code embodied in the medium, the computer-readable program code comprising:

computer-readable program code that creates one or more speech samples using an input voice of a human, the speech samples resulting from the human uttering a first text;

computer-readable program code that analyzes said speech samples to extract a separate set of sound parameter values associated with personal speech characteristics of said input voice for each of first and second speech patterns, wherein the first and second speech patterns represent different manners of speaking in a same language, and wherein the sound parameter values relate to at least one quality selected from the group consisting of pitch, breathiness, tone, speed, volume, pitch variation, breathiness variation, tone variation, speed variation and volume variation;

computer-readable program code that determines a separate set of output synthesis parameter values for each of the first and second speech patterns based, at least in part, on the respective separate set of sound parameter values of said input voice;

computer-readable program code that stores each separate set of output synthesis parameter values as a separate speech profile element for the human;

computer-readable program code that analyzes at least a portion of at least one second text, the at least one second text being unrelated to the first text, to select, from among the separate speech profile elements of the first and second speech patterns, a selected separate speech profile element based on how well the selected separate speech profile element corresponds to the at least a portion of the at least one second text; and computer-readable program code that applies the separate set of output synthesis parameter values of the selected separate speech profile element to synthesize the at least a portion of the at least one second text to speech that includes at least some of the personal speech characteristics of the input voice.

12. The computer program product of claim 11, wherein said computer-readable program code creating the one or more speech samples using the input voice includes computer-readable program code that elicits a plurality of speech patterns of said input voice, and wherein said computer-readable program code analyzing said speech samples includes computer-readable program code that associates sound parameters with speech patterns of the plurality of speech patterns of said input voice.

13. The computer program product of claim 11, wherein said computer-readable program code analyzing the at least a portion of the at least one second text comprises computer-readable program code that determines that the at least a portion of the at least one second text contains one or more triggers associated with the speech pattern corresponding to the selected separate speech profile element.

14. The computer program product of claim 11, wherein at least one of the first and second speech patterns represents an emotional state.

15. The computer program product of claim 12, wherein the computer-readable program code that elicits the plurality of speech patterns comprises computer-readable program code that constructs the first text to elicit the plurality of speech patterns when the human utters the first text.

\* \* \* \* \*